United States Patent [19]

Otsuki et al.

[11] Patent Number: 5,751,805
[45] Date of Patent: May 12, 1998

[54] DATA-PROTECTING SYSTEM

[75] Inventors: Kazunori Otsuki, Yokohama; Shinichirou Watanabe, Tokyo, both of Japan

[73] Assignee: Kabushiki Kaisya Advance, Tokyo, Japan

[21] Appl. No.: 564,262

[22] PCT Filed: Apr. 21, 1995

[86] PCT No.: PCT/JP95/00796

§ 371 Date: Dec. 20, 1995

§ 102(e) Date: Dec. 20, 1995

[87] PCT Pub. No.: WO95/29438

PCT Pub. Date: Nov. 2, 1995

[30] Foreign Application Priority Data

Apr. 22, 1994 [JP] Japan .................... 6-106316

[51] Int. Cl.$^6$ .................................................. H04L 9/16
[52] U.S. Cl. .................................. 380/4; 380/21
[58] Field of Search ................................ 380/4, 21

[56] References Cited

U.S. PATENT DOCUMENTS

| | | | |
|---|---|---|---|
| 4,333,207 | 6/1982 | Best | 380/4 |
| 4,484,025 | 11/1984 | Ostermann et al. | 380/21 |
| 5,103,476 | 4/1992 | Waite et al. | |

FOREIGN PATENT DOCUMENTS

| | | |
|---|---|---|
| 63-36634 | 2/1988 | Japan . |
| 63-58538 | 3/1988 | Japan . |
| 63-107667 | 5/1988 | Japan . |
| 1-284890 | 11/1989 | Japan . |
| 3-83132 | 4/1991 | Japan . |
| 4-38029 | 2/1992 | Japan . |

OTHER PUBLICATIONS

"Constitution of Simple One–way Algorithm," Matsumoto et al., Shingakugiho Co., IT89–23, Jul., 1989.

Matsumoto et al., "IC Card for Key Predistribution System and Cryptographic Communication", IEICE Spring National Convention Lecture Transactions, pp. 1–282, (1990).

*Primary Examiner*—Salvatore Cangialosi
*Attorney, Agent, or Firm*—Finnegan, Henderson, Farabow, Garrett & Dunner

[57] ABSTRACT

A data-protection system which permits authorized users to use a target data through a simple operation but does not permit unauthorized users to use the program even though they may be able to copy it. A data-protecting system in which a center prepares a special algorithm which is secretly held by the center only, the center prepares a secret algorithm exclusively for the data and for the user by applying the center algorithm to the data and the user identifier which are inherent to the data and the user, and are well-known to the public and are used without any change, and supplies the secret algorithm to the user and to the data supplier and then when it happens that the data supplier must supply a data to the user, the data supplier prepares the same and a specific encryption key between the data that is to be supplied and the user by inputting the user identifier to the secret algorithm of the data that is to be supplied, encrypts part or whole of the data that is to be supplied directly or indirectly based on the encryption key and supplies it to the user, and the user prepares the same encryption key between the data that is supplied and the user based upon the data identifier that is supplied and his own secret algorithm and decrypts the encrypted data directly or indirectly.

3 Claims, 3 Drawing Sheets

DATA-PROTECTING SYSTEM

TECHNICAL FIELD

The present invention relates to a system for protecting data such as application software, OS software, etc.

BACKGROUND ART

At present, duplication of data such as application programs, OS software, utility programs, etc. by unauthorized persons is an everyday affair, and no effective countermeasure has yet been devised against unauthorized use of such illegally duplicated programs and software.

DISCLOSURE OF THE INVENTION

It is an object of the present invention to solve the above-mentioned defect inherent in the prior art and provide a data-protecting system which permits an authorized user to use a predetermined data, which could include software, in an ordinary manner and to easily but effectively prevent unauthorized users from using the data.

That is, the present invention is concerned with a data-protecting system in which a center, for example a vender of data, prepares a special algorithm, i.e., a center algorithm which is secretly held by the center only. The center then prepares a secret algorithm exclusively for the data and for the user by applying the center algorithm to the data, which can include software, for each data to be used by an individual user, and applying the user identifier. The secret algorithm is supplied to the user and to the data or software supplier, and the data or software supplier prepares the shared encryption key used between the data or software supplier and the user relying upon the user identifier and the secret algorithm of the data or software that is supplied, and encrypts part or all of the data or software that is to be supplied directly or indirectly based upon the encryption key, and then supplies it to the user. The user then prepares the shared encryption key used between the data or software supplier and the user, based upon the data or software identifier that is supplied, and his own secret algorithm, and decrypts the encrypted software directly or indirectly.

BEST MODE FOR CARRYING OUT THE INVENTION

Figure 1:
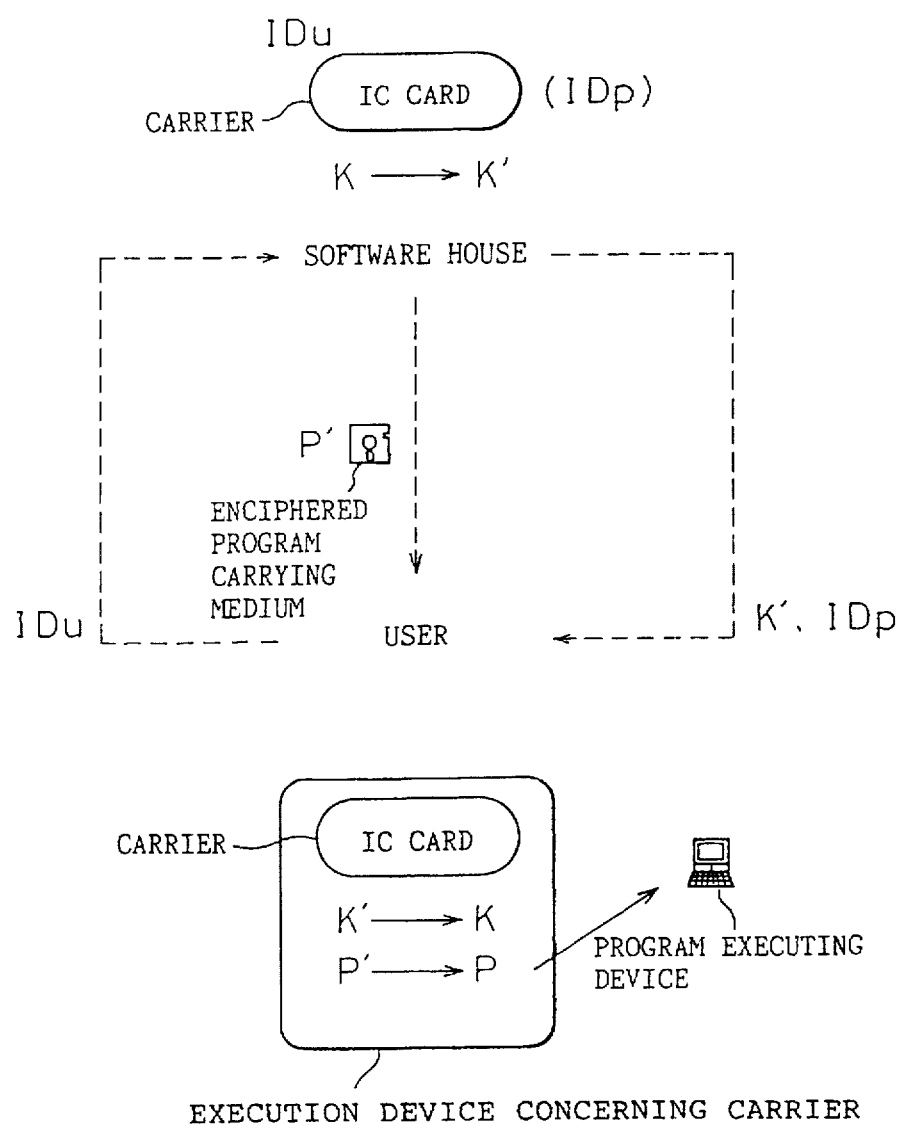
FIGS. 1 to 3 are diagrams illustrating a method of embodying the present invention.

In the following embodiment, software is referred to as the object to be protected. However, as mentioned above, any data including software can be protected, by the present invention.

According to the present invention as described above, there is realized a software-protecting system in which a center prepares a special algorithm or a center algorithm which is secretly held by the center only. The center prepares a secret algorithm exclusively used for the software and for the user by applying the center algorithm to the software identifier and the user identifier which are inherent to the software and the user, respectively, and are already known to the public and are used without any substantial change. The secret algorithm is supplied to the user and to the software supplier, and then when it happens that the software supplier must supply software to the user, the software supplier prepares a shared encryption key inherent to both the software that is to be supplied, and the user, by inputting the user identifier into the secret algorithm of the software that is to be supplied, and encrypts part or all of the software that is to be supplied directly or indirectly based on the encryption key and supplies it to the user. The user prepares the shared encryption key between the software that is supplied and the user, by inputting the software identifier that is supplied into his own secret algorithm and decrypts the encrypted software directly or indirectly. Accordingly, the authorized user is allowed to use the software through simple operation but other unauthorized users are not able to use it even though they may be able to copy it.

That is, according to the present invention, a center (such as, for example, an administration authority) is provided and secretly holds a center algorithm.

The center prepares a secret algorithm from the center algorithm, user and software identifiers (name, address, administration number, given code, symbols, numerals, etc.), and distributes it to the user and to the software. Note that the identifiers may be one already well-known or not well known to the public or a one inherent to the user or the software which is used without any change, for example. The software to which the center supplies the secret algorithm made for the software is, for example, the software itself, the software supplier, or both.

Here, the software can be an application program, an OS, a utility program or any other program or data, and the secret algorithm prepared by the center is applied to each one of the software that are to be supplied to the user irrespective of the contents of the software.

The software supplier can be a supplier that supplies software to the user, such as, a software house, related manufacturer, vendor or software or apparatus for supplying software, or any other entity that supplies software to users requiring a charge or free of charge.

The software supplier may often be merged into a center, and the center may often be merged with a user. The software supplier could become a user when the supplier takes a position of using the software.

Here, the user and the software which is designated to be used, will have received a secret algorithm and identifier from the center in advance or just before the operations will be carried out.

A user means a person who uses the program as well as an apparatus which is directly or indirectly possessed by the user and executes the software, a device associated with the apparatus, the software itself, etc.

FIG. 1 schematically illustrates the operation of the present invention.

At least a part of a program (P) distributed from the software supplier to the user is encrypted (P') in advance by a separate encryption key, i.e., a second encryption key (K) inherent to the program and a secret algorithm. At the time of installing the program, a user requests the software supplier to supply his identifier (IDu).

The software supplier prepares a first encryption key by using the identifier (IDu) that is applied and the secret algorithm inherent to the program, encrypts (K') the above-mentioned second encryption key K by using the first encryption key and the encrypted algorithm, and distributes the encrypted second encryption key (K') to the user.

The user installs the encrypted program (P') by using the encrypted second encryption key (K') that is distributed and installation software that is directly or indirectly attached to the encrypted program (P').

The installation software prepares a loader which includes the encrypted second encryption key (K') and is linked to the encrypted program (P'). When the loader is executed, the loader always prepares a shared key (first encryption key) by using the user's secret algorithm and the program identifier, and decrypts the encrypted second encryption key (K') together with the decryption algorithm thereby to prepare the second encryption key, and then decrypts (P) the encrypted program (P') by using the second encryption key and the decrypted algorithm.

In the foregoing was described an indirect method of encrypting or decrypting the program by using two encryption keys. The invention, however, is not limited to the above-mentioned indirect method using a plurality of encryption keys only but can also be applied to a direct method which encrypts or decrypts the program by using a single encryption key (shared key obtained from its own secret algorithm and the user identifier or the program identifier).

The methods and contents related to steps for preparing shared keys, such as the method of preparing a center algorithm, the method of preparing a secret algorithm, the method of preparing a shared encryption key, entity, definition of identifiers, etc., have been disclosed in Japanese Unexamined Patent Publications (Kokai) Nos. 36634/1988 and 107667/1988.

The identifiers can be applied to the secret algorithm not only by the systems disclosed in the above-mentioned publications but also by a system disclosed in literature (Matsumoto, Takashima, Imai: "Constitution of Simple One-way Algorithm", Shingakugiho Co., IT89-23, July, 1989).

The two or more encrypted or decrypted algorithms may be the same ones as represented by, for example, a DES (Data Encryption Standard) system, FEAL (Fast Data Encipherment Algorithm) system, etc. However, any other system may be employed depending upon the speed and the degree of encryption.

Embodiment 1

Figure 2:
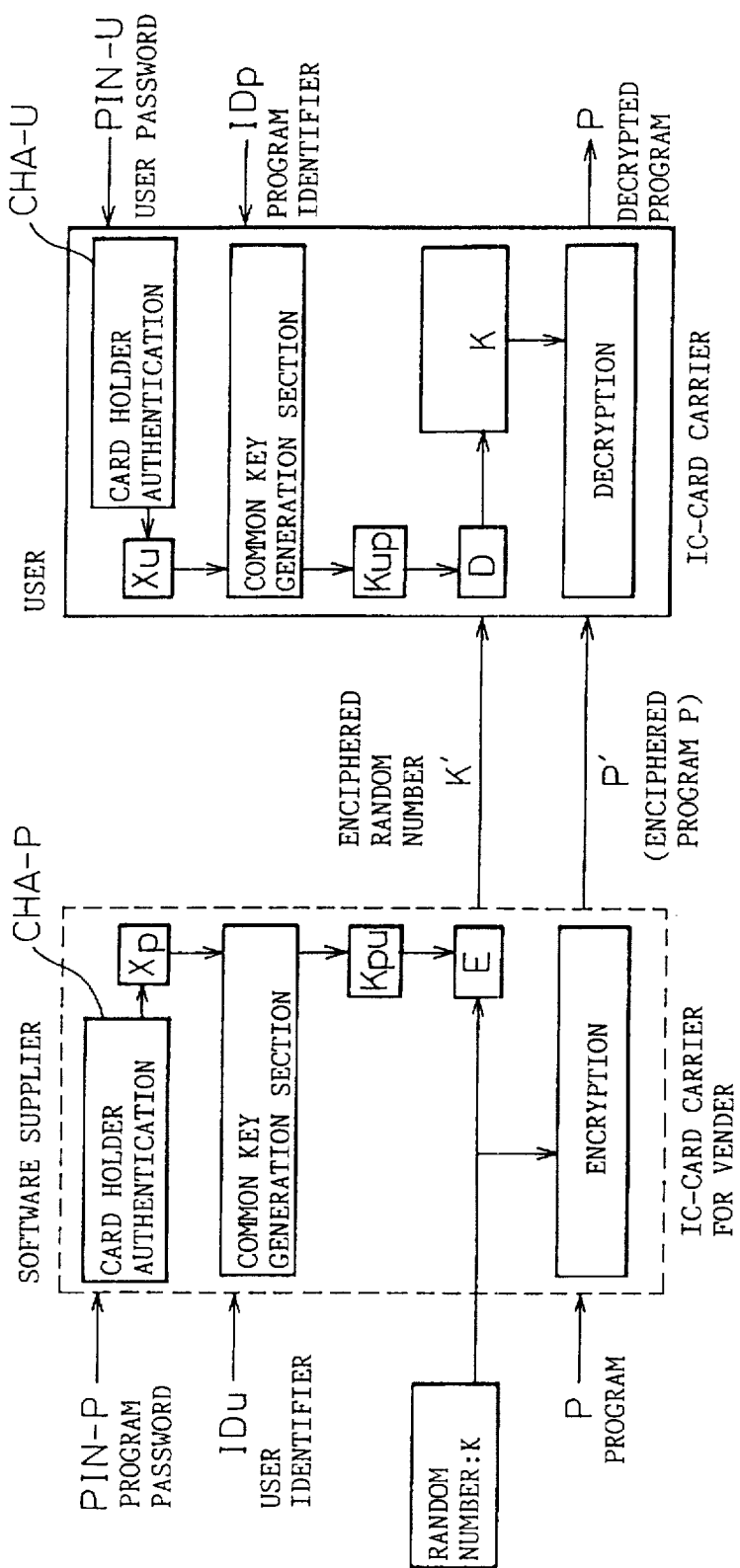

FIG. 2 is a diagram for explaining a first embodiment of the present invention. Here, the center portion is the same as the one mentioned above and is not described again.

(1) The user possesses a carrier (e.g., IC card, diskette, or any other storage medium) storing a secret algorithm and a personal authentication algorithm obtained from the center, a carrier execution unit which works in cooperation with the carrier, and an identifier. Similarly, the software supplier possesses a carrier storing an algorithm therein and a carrier execution unit. The software supplier need not possess the algorithm in the constitution of the carrier and the carrier execution unit.

(2) A back-up can be freely executed.

(3) Applicable to all software houses (software suppliers) and to all programs.

Environments and Definitions

Software house (software supplier): Administers a secret algorithm (program identifier is denoted as IDp) inherent to a program (P) that is to be sold.

When a program is sold, an enciphered program (P') is sold, which is obtained by enciphering at least a part of the program (P) by utilizing a given random number (K) (second encryption key) (which is inherent to P) and an encrypted algorithm. The program (P') is a file that cannot be executed.

The user who has purchased the encrypted program (P') applies his own identifier (IDu). Upon receiving an application from the authorized user, therefore, the first encryption key is produced by using the identifier (IDu) and the secret algorithm, and then a random number (K) which is the second encryption key is encrypted by using the first encryption key and the encrypted algorithm to produce an encrypted random number (K') and thereafter the encrypted random number (K') (K' includes data accompanying the first encryption key preparation system) is distributed to the user.

User: Request the software house to supply his identifier (IDu), at the time to install the purchased program. Sometimes it is not necessary to request to supply. The encrypted random number (K') sent from the software house is input to the installer software. The program is used by using a loader prepared by using the installer software.

Installation software: Prepares a loader by using an identifier (IDp) input by the user and an encrypted random number (K') and links it to the encrypted program (P'). The installer software is attached to the encrypted program (P') or is separately obtained (distributed free of charge), and is used in common for all programs.

Loader: Obtains the program (P) by decrypting the encrypted program (P') by using the carrier possessed by the user and the carrier execution unit and by giving, as parameters, an identifier (IDp) of the program possessed in the file and the encrypted random number (K'). The program (P), however, exists in the memory only but does not assume the form of a file. The encrypted program P' is encrypted for the required portion only, and the program (P) does not exist in a complete form. No decryption routine exists in the loader.

Carrier execution unit: Is a unit which is formed integrally with, separately from, or incorporated in, the target program execution unit (e.g., personal computer, office computer, WS, or any other execution unit) and being connected thereto (using infrared ray, electricity, light, ultrasonic waves, electromagnetic waves, etc.), and is equipped with a mechanism for reading and writing the carrier (e.g., IC card, diskette, or any other recording medium), contains a decryption program (decryption algorithm) (adapter cipher engine: ACE), and decrypts the encrypted program (P') based on the random numbers (K) output by the carrier. The random numbers (K) exist only in the carrier execution unit but are not output to the external unit.

By taking the future feasibility of this system into consideration, furthermore, it is desired that the ACE is designed to be capable of being version-upgraded or to be capable of being modified (DES → FEAL, etc.). The carrier and the carrier execution unit are only a few examples, and they may further be merged and incorporated into the target program execution unit, or may be formed as an integrated structure, or further may be formed separately from each other, or may be connected additionally or intermediately to an interface connected to a printer or a connecting portion of RS232C or connected to each other, or may be so programmed as to operate in the target program execution unit.

Further, the carrier execution unit may be an apparatus including a function of the carrier therein, without using a carrier, separately formed from the unit, such as an IC card.

Procedure of Processing (1) Processing on the Software House Side—before the distribution of the program—

The software house divides the target program (P) into a plurality of loadable modules and, further, so designs the program that the modules are not all loaded at once into the memory.

The software house encrypts a given part of each of the modules that are divided. Address data of the encrypted part exists in the encrypted program (P'). The address data itself may be encrypted.

A random number (second encryption key) (K) used for the encryption is unique for each of the programs. It may further be made unique for each of the modules.

Any encryption means may be used, provided it can be operated by the decryption program (decryption algorithm) ACE incorporated in the carrier execution unit. When the software supplier has its own ACE and distributes it to the users, the encryption means is not necessarily common to all software suppliers.

(2) Processing on the User Side—when the program is purchased—(carrier, carrier execution unit and installer software are assumed to have already been provided)

The user is registered by the software supplier, and the person identifier is applied.

(3) Processing on the Software House Side—when the user is registered—

The random number (K) is encrypted (K') by using the identifier (IDu) applied by the user and the secret algorithm (Xp) specific to the program that is distributed.

In this regard, when the secret algorithm (Xp) is used, as shown in FIG. 2, a password code (PIN-P) is input, and a determination of whether or not a person having the password is the actual registered person, is judged relying upon the personal authentication algorithm (CHA-P). The personal authentication algorithm (CHA-P) and the password code (PIN-P) are provided together with the secret algorithm (Xp) from the center, and may be arbitrarily used and may, further, be arbitrarily provided from the center. The same also holds for the personal authentication algorithm (CHA-U) and the password code (PIN-U) on the user side.

The software supplier sends the encrypted random number (K') to the user. The encrypted random number (K') may be sent by any method such as telephone, facsimile, personal computer communication or floppy disk (when DES is used for encrypting the program P, the amount of data to be sent to the user is, for example, 16 bytes (which corresponds to 32 characters when converted into a character sequence)). The program identifier (IDp) may be notified to the user together with the encrypted random number (K') or may otherwise be printed on the package at the time of distributing the encrypted program (P').

(4) Processing on the User Side—when the program is installed—

The user starts the installer software and inputs the encrypted random number (K') that is sent and the program identifier (IDp).

The install software prepares the loader using the encrypted random number (K') that input and the program identifier (IDp), and is linked to the encrypted program (P') (P' with loader). The loader is a utility which can be processed by an OS (MS-DOS), and works as a mediator between the OS and the encrypted program (P'). At this moment, the encrypted program (P') still remains encrypted.

(5) Processing on the User Side—when the program is executed—

The encrypted program P' with loader is started to authenticate the person who has the carrier.

The loader prepares the first encryption key (Kup) from the program identifier (IDp) and the secret algorithm (Xu), gives the encrypted random number (K') to the carrier execution unit, and decrypts the encrypted random number (K') based on the first encryption key (Kup) and the decryption program (D). The decrypted random number (K), however, stays in the carrier execution unit and is not output to the external unit.

The loader gives to the carrier execution unit an encryption part of the encrypted program (P') and the unit decrypts it using the decryption program (DE) and the random number (K), to thereby obtain the program P and thus the program P is executed.

The loader monitors the execution condition of the program (P) at all times, and causes the carrier execution unit to decrypt the encrypted program (P') every time the encryption portion of the encrypted program (P') is read out.

In this regard, the encrypted program (P') by itself cannot be decrypted and is delivered to the authorized users only in a variety of states. This may be, for example, a state in which a plurality of programs (the functions of which, however cannot be executed when the password is not given thereto) which already have or will have a secret algorithm are recorded in a large-capacity recording medium such as CD-ROM, and the user who already has or will have the secret algorithm uses the programs and obtains the password and identifier of a program which he likes by paying a royalty.

In this regard, there is a convenience, as described below, even for the software supplier.

The software supplier may only prepare the encrypted program by a copying operation, and thus the encrypted program may be mass-produced.

The hardware that is required can be used by a plurality of software suppliers.

Figure 3:
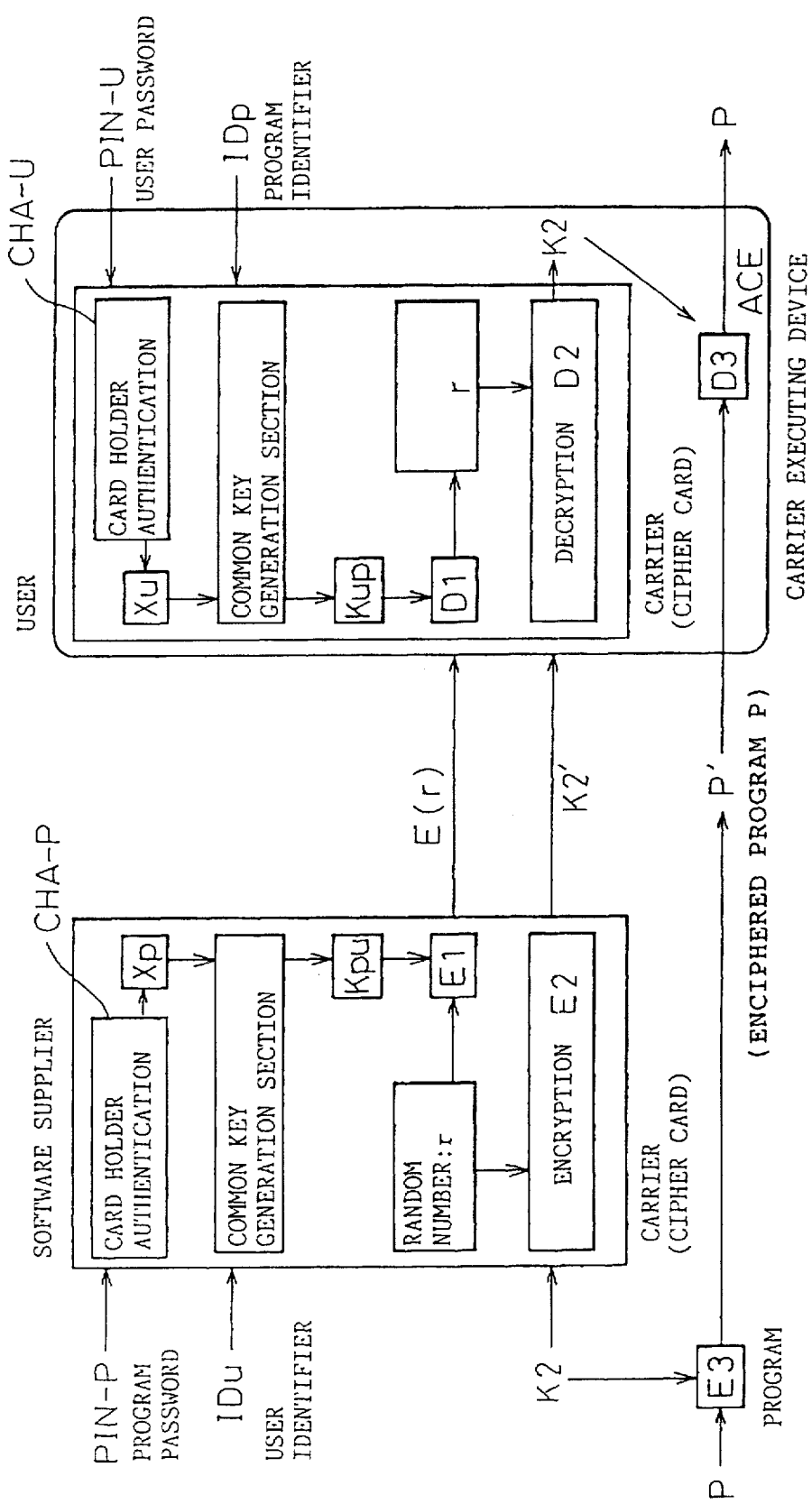

A further embodiment is illustrated in FIG. 3, wherein a third encryption key, an encryption algorithm and a decryption algorithm are further added to the embodiment of FIG. 2.

The first encryption key (Kup) is arithmetically obtained by applying the secret algorithm and the identifier (IDp) of the user or program (regarding the user, a target program is the identifier of the program).

The second encryption key (r) is a random number and is arbitrarily set. The third encryption key (K2) is arbitrarily set in the same manner as the second encryption key.

The software supplier converts part or all of the third encryption key (K2) into the encrypted third encryption key (K2') using the second encryption key (r) and the encryption algorithm (E2).

Moreover, the software supplier converts part or all of the second encryption key (r) into the encrypted second encryption key (E(r)) using the first encryption key (Kpu) and the encryption algorithm (E1).

The software supplier supplies the encryption program (P'), encrypted second encryption key (E(r)) and the encrypted third encryption key (K2') to the user.

The user prepares the second encryption key (r) which is decrypted from the encrypted second encryption key (E(r)) using the first encryption key (Kup) and the decryption algorithm (D1), and prepares the third encryption key (K2) by decrypting the encrypted third encryption key (K2') using the second encryption key (r) and the decryption algorithm (D2).

The program (P) is prepared by decrypting the encrypted program (P') using the third encryption key (K2) and the decryption algorithm (D3).

In the foregoing, the operation of FIG. 3 was described schematically. Other operations are as described with reference to FIG. 2.

According to the present invention as described above in detail, the software and the user are given specific secret algorithms and an identifier through an authority which is called a center. The user possesses encrypted software and inputs the identifier of the software into his own secret algorithm only when it is desired to easily decrypt it and use it. The operation is thus simple. In addition, possessing the secret algorithm, the user is allowed to use the software as long as the identifier is available even if the software is changed, and thus a burden on the user will be reduced.

For the unauthorized users, on the other hand, even though they may get it, it is quite difficult for them to decrypt the encrypted software.

We claim:

1. A data-protecting system comprising a center, a program supplier and a user, wherein:

the center produces a special algorithm held secretly only by the center; applies the special algorithm to a user identifier and a program dividable into a plurality of loadable modules to produce a secret algorithm exclusive to the program and the user; and supplies the produced secret algorithm to the user and program supplier;

the program supplier produces a first encryption key using the user identifier and the secret algorithm; encrypts a second encryption key using the first encryption key; encrypts one module of the plurality of loadable modules to form an encrypted program; produces an installation program using a program identifier and the encrypted second encryption key, wherein the installation program produces, only when the encrypted module in the encrypted program is executed, a common key using the program identifier and the secret user algorithm to produce a loader for decrypting the encrypted program; and supplies the user with the program identifier, the encrypted second encryption key, the encrypted program, and the installation program; and the user causes the supplied installation program to be operated by its own program execution means to cause the installation program to install the encrypted program and produce the loader; operates the loader when the encrypted module of the encrypted program is executed by the program execution means to produce a common key by using the program identifier and the secret user algorithm to decrypt the encrypted second encryption key; and decrypts the program by using the decrypted second encryption key.

2. The data-protecting system according to claim 1, wherein said second encryption key is encrypted using a random number.

3. A data-protecting system comprising a center, a program supplier and a user, wherein:

the center produces a special algorithm held secretly only by the center; applies the special algorithm to a user identifier and a program dividable into a plurality of loadable modules to produce a secret algorithm exclusive to the program and the user; and supplies the produced secret algorithm to the user and program supplier;

the program supplier produces an encryption key using the user identifier and the secret algorithm; encrypts a second encryption key using the first encryption key; encrypts a third encryption key using the encrypted second encryption key; encrypts one module of the plurality of loadable modules to form an encrypted program using the third encryption key; produces an installation program using the program identifier and the encrypted third encryption key; wherein the installation program produces, only when the encrypted module in the program is executed, a common key using the program identifier and the secret algorithm to produce a loader for decrypting the encrypted program; and supplies the user with the program identifier, the encrypted third encryption key, the encrypted program, and the installation program; and the user causes the installation program to be operated by its own program execution means to cause the installation program to install the encrypted program and produce the loader, and to operate the loader when the encrypted module of the encrypted program is executed by the program execution means to produce a common key using the program identifier and the secret user algorithm to decrypt the encrypted second encryption key, and decrypt the encrypted third encryption key, and decrypt the encrypted program using the decrypted third encryption key.

* * * * *